(No Model.)

W. FRIEND.
LUBRICANT BLOCK.

No. 445,988. Patented Feb. 10, 1891.

Attest:
C. W. Benjamin
A. S. Fales.

Inventor:
William Friend
By Arden S. Fitch
Atty.

UNITED STATES PATENT OFFICE.

WILLIAM FRIEND, OF NEW YORK, N. Y.

LUBRICANT BLOCK.

SPECIFICATION forming part of Letters Patent No. 445,988, dated February 10, 1891.

Application filed May 9, 1890. Serial No. 351,161. (No model.)

*To all whom it may concern:*

Be it known that I, WILLIAM FRIEND, of the city, county, and State of New York, a citizen of the United States, have invented an Improved Lubricant Block, of which the following is a full, clear, and exact description, reference being had to the accompanying drawings, forming part of this specification.

My invention relates to that class of lubricants which are composed of plumbago, graphite, and a resinous substance—such as shellac or other analogous animal, mineral, or vegetable substances—as lubricating ingredients, and which ingredients are employed in a finely comminuted or powdered and permanently-solid state and are compressed after mixing into a permanently-solid form and used in such form for purposes of lubrication.

My invention consists, as a new article of manufacture, in a lubricant block composed of a mass of finely comminuted or powdered and permanently-solid lubricant material and a case or envelope of permanently-rigid material laterally surrounding and inclosing the mass of lubricant, said lubricant mass and its rigid envelope being compressed together into a single integral block, substantially as and for the purpose hereinafter set forth.

Figure 1:
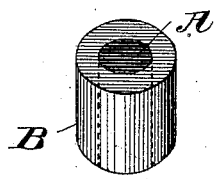
Figure 2:
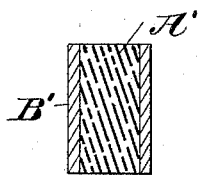
Figure 4:
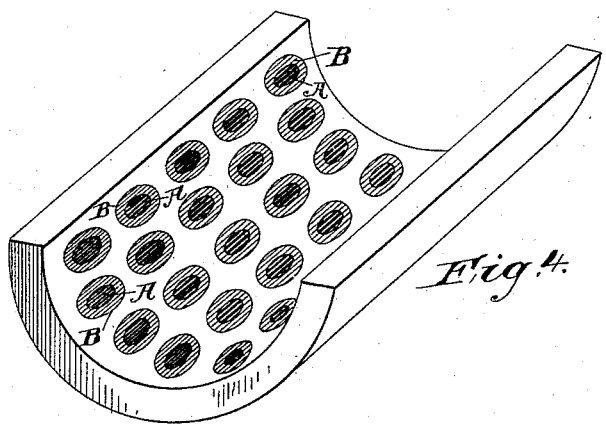
Figure 3:
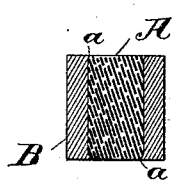

Figure 1 is an elevation in perspective of a lubricant block containing my invention. Figs. 2 and 3 illustrate in vertical central section a method of fabricating a lubricant-block containing my invention; and Fig. 4 is a plan in perspective of a journal-bushing, illustrating the application of lubricant blocks thereto containing my invention.

Hitherto in fabricating a solid lubricant for use in journal bearings, bushings, gibs, &c., the ingredients composing the solid lubricant have either been compressed into blocks or plugs, and these blocks or plugs have then been in a naked state handled and transported to and seated in suitable recesses formed in series in the face of the bearing or bushing, or the solid lubricant has been made in sheets and pressed to or into and covering entirely the surface of the bearing or bushing, or been compressed into the form of a bushing itself and then seated in the bearing, or the solid lubricant has been compressed directly into recesses, interstices, or cells formed in the face of the bearing. The method usually resorted to, however, is to form the ingredients of the solid lubricant into naked blocks or plugs by severe pressure, and to thereafter seat these plugs in corresponding recesses in the journal bearing or bushing; but, as the naked blocks or plugs formed by the compression of the lubricant ingredients are more or less fragile and are liable to become friable with age, owing to the nature of the ingredients and the practical impossibility to so compact the ingredients by pressure that they will not be affected by atmospheric changes or percussion and concussion, the blocks are liable to be damaged in handling and transportation, and thus to be so broken or chipped as to destroy that uniformity of shape which is necessary to their proper application to bearings by insertion in recesses in the faces thereof.

The object of my invention is to provide blocks of permanently-solid lubricant material, which may be kept in stock for an indefinite period by the manufacturer, and which may be handled and transported without the exercise of any special precautions, and which will not thereby have their effectiveness as lubricants lessened or destroyed.

In fabricating my improved lubricant block I take a mass of the finely comminuted or powdered ingredients of the permanently-solid lubricant material, which mass may be of any desired shape or outline, but which is preferably in the form of a short cylinder, and I combine with this mass A a single and individual rigid case or envelope B, which may be of metal, such as Babbitt metal, or of wood, or vulcanized fiber, or an analogous material possessing equivalent rigidity, the said case or envelope corresponding and conforming to the lubricant mass and laterally surrounding and inclosing said mass, as shown—that is to say, on all sides except the top or bottom ends, or both, of the lubricant mass—the said lubricant mass and its envelope being combined by the application of severe pressure to them conjointly, whereby they are together compressed into a single, integral, and permanently-solid block. The said block may be conveniently formed by filling a tube B' with a partially-compressed lubricant mass A', as shown in Fig. 2, and then by means of a suitable die and plunger compressing the combined mass A' and its enveloping tube B' into the single integral permanently-solid form shown at A B in Figs. 1 and 3. When thus subjected to pressure, the inner edges of the ends of the tube B' may be crowded somewhat over and upon the ends of the compressed lubricant mass A', so that these edges will then operate to lock the lubricant mass in the envelope, as indicated at a, Fig. 3. The lubricant block thus constituted of the permanently-solid lubricant mass A and the single and individual corresponding rigid case B, integral with and laterally surrounding and inclosing said lubricant mass, may be kept in stock for an indefinite time by the manufacturer without deterioration as an effective lubricant, and may be handled and transported without particular precaution, the laterally-inclosing case serving to maintain the lubricant mass in proper and original form and to protect it from injury by contact with other objects.

When it is desired to utilize these described blocks as permanently-solid lubricants in a journal bearing or bushing, they may, each inclosed laterally, as described, in its individual integral case, be seated fixedly in suitable or corresponding recesses formed in the face of the bearing, as illustrated in Fig. 4.

I am aware that a mass of lubricant which is solid at ordinary atmospheric temperatures, but which fluidizes on its surface being exposed to friction, as in a bearing, has been heretofore inclosed in a case of paper, cloth, tin-foil, or analogous material capable of rapid reduction by friction, and therefore I do not claim, broadly, herein a lubricant block composed of a lubricating mass inclosed in a case or envelope; but it will be observed that the lubricating device above noted is capable of effective use as a lubricant for bearings only as it is positively fed to contact with the journal, and as the heat generated by the friction of the solidified lubricant on the journal fluidizes the lubricant and said friction concurrently reduces or wears away the fragile envelope, while my lubricant block is composed of a permanently-solid mass of lubricating material and an envelope of correspondingly-permanent rigidity, the two being compressed together into a single integral and definitively-solid block and said block serving as a lubricant to the bearing when fixedly seated in the bearing or bushing. I intend to make my claim hereunder, therefore, to a lubricant block of the character and for the purpose set forth.

What I claim as my invention, and desire to secure by Letters Patent, is—

As a new article of manufacture, a lubricant block composed of a mass of permanently-solid lubricant material and a case or envelope of correspondingly permanently-rigid material laterally surrounding and inclosing the solid lubricant, said lubricant mass and its rigid envelope being compressed together into a single integral and permanently-solid block adapted to serve as a lubricant when fixedly seated in a bearing, substantially as specified.

WILLIAM FRIEND.

Witnesses:
A. S. FITCH,
A. T. FALES.